United States Patent
Anerousis et al.

(10) Patent No.: US 9,785,461 B2
(45) Date of Patent: *Oct. 10, 2017

(54) PERFORMING SERVER MIGRATION AND DEPENDENT SERVER DISCOVERY IN PARALLEL

(71) Applicant: International Business Machines Corporation, Armonk, NY (US)

(72) Inventors: Nikolaos Anerousis, Chappaqua, NY (US); Kun Bai, Hartsdale, NY (US); Hubertus Franke, Cortlandt Manor, NY (US); Jinho Hwang, Ossining, NY (US); Jose E. Moreira, Irvington, NY (US); Maja Vukovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 228 days.

This patent is subject to a terminal disclaimer.

(21) Appl. No.: 14/744,175

(22) Filed: Jun. 19, 2015

(65) Prior Publication Data

US 2016/0335105 A1   Nov. 17, 2016

Related U.S. Application Data

(63) Continuation of application No. 14/712,117, filed on May 14, 2015.

(51) Int. Cl.
 *G06F 15/16* (2006.01)
 *G06F 9/455* (2006.01)
 (Continued)

(52) U.S. Cl.
 CPC .......... *G06F 9/45558* (2013.01); *H04L 12/40* (2013.01); *H04L 41/0813* (2013.01);
 (Continued)

(58) Field of Classification Search
 CPC ......... H04L 67/10; H04L 67/42; H04L 43/16; H04L 12/40; G06F 9/45558; G06F 2009/4557; G06F 2009/45591
 (Continued)

(56) References Cited

U.S. PATENT DOCUMENTS 7,284,043 B2   10/2007   Feinleib et al.
7,769,720 B2   8/2010    Armington
(Continued)

FOREIGN PATENT DOCUMENTS

WO   WO2013055601 A1   4/2013

OTHER PUBLICATIONS

List of IBM Patents or Patent Applications Treated as Related, 2 pages.
(Continued)

*Primary Examiner* — Frantz Jean
(74) *Attorney, Agent, or Firm* — Yee & Associates, P.C.; Louis Percello

(57) ABSTRACT

Performing server virtual machine image migration and dependent server virtual machine image discovery in parallel is provided. Migration of a server virtual machine image that performs a workload is started to a client device via a network and, in parallel, an identity is continuously discovered of a set of dependent server virtual machine images corresponding to the server virtual machine image being migrated to the client device. In response to discovering the identity of the set of dependent server virtual machine images, a server migration pattern of the discovered set of dependent server virtual machine images is generated for the workload. A level of risk corresponding to migrating each dependent server virtual machine image of the discovered set of dependent server virtual machine images to the client device is calculated based on the server migration pattern of
(Continued)

the discovered set of dependent server virtual machine images for the workload.

5 Claims, 6 Drawing Sheets

(51) Int. Cl.
   *H04L 12/40* (2006.01)
   *H04L 12/26* (2006.01)
   *H04L 29/08* (2006.01)
   *H04L 29/06* (2006.01)
   *H04L 12/24* (2006.01)
(52) U.S. Cl.
   CPC .............. *H04L 41/12* (2013.01); *H04L 41/16* (2013.01); *H04L 43/16* (2013.01); *H04L 67/10* (2013.01); *H04L 67/42* (2013.01); *G06F 2009/4557* (2013.01); *G06F 2009/45591* (2013.01); *H04L 41/0883* (2013.01)
(58) Field of Classification Search
   USPC .................................................. 709/217, 219
   See application file for complete search history.

(56) References Cited

U.S. PATENT DOCUMENTS

| | | | |
|---|---|---|---|
| 8,706,754 B2 | 4/2014 | Channing | |
| 2011/0126197 A1 | 5/2011 | Larsen et al. | |
| 2013/0346619 A1 | 12/2013 | Panuganty et al. | |
| 2016/0139852 A1* | 5/2016 | Huang .................. | G06F 3/0647 718/104 |
| 2016/0142261 A1* | 5/2016 | Huang .................. | G06F 3/0647 709/223 |

OTHER PUBLICATIONS

Apte et al., "Look Who's Talking: Discovering Dependencies between Virtual Machines Using CPU Utilization," Proceedings of the 2nd USENIX Conference on Hot Topics in Cloud Computing, Jun. 2010, pp. 1-7.

Binz et al., "Automated Discovery and Maintenance of Enterprise Topology Graphs," Proceedings of the 6th IEEE International Conference on Service-Oriented Computing and Applications, Dec. 2013, pp. 126-134.

Buyya et al., "InterCloud: Utility-Oriented Federation of Cloud Computing Environments for Scaling of Application Services," Algorithms and Architectures for Parallel Processing, Lecture Notes in Computer Science vol. 6081, May 2010, pp. 13-31.

Hajjat et al., "Cloudward Bound: Planning for Beneficial Migration of Enterprise Applications to the Cloud," Proceedings of the ACM SIGCOMM 2010 Conference, Aug.-Sep. 2010, pp. 243-254.

Menzel et al., "CloudGenius: Decision Support for Web Server Cloud Migration," Proceedings of the 21st International Conference on World Wide Web, Apr. 2012, 10 pages.

Yang et al., "Effective Multi-Label Active Learning for Text Classification," Proceedings of the 15th ACM SIGKDD International Conference on Knowledge Discovery and Data Mining (KDD '09), pp. 917-926.

Anerousis et al., "Performing Server Migration and Dependent Server Discovery in Parallel", U.S. Appl. No. 14/712,117, filed May 14, 2015, 37 pages.

Office Action, dated May 5, 2017, regarding U.S. Appl. No. 14/712,117, 21 pages.

Notice of Allowance, dated Jun. 22, 2017, regarding U.S. Appl. No. 14/712,117, 11 pages.

\* cited by examiner

SVM-BASED ACTIVE LEARNING ALGORITHM
300

302 — INPUTS: LABELED SET $D_l$, UNLABELED SET $D_u$, NUMBER OF STEPS T, NUMBER OF EXAMPLES PER ITERATION S
t = 1;
*WHILE t <= T do*

304 — TRAIN A MULTI-LABEL SVM CLASSIFIER f BASED ON TRAINING DATA $D_l$
FOR EACH INSTANCE x IN $D_u$ do

306 — PREDICT ITS LABEL VECTOR $\underline{y}$ USING THE LR(LOSS REDUCTION)-BASED PREDICTION METHOD $D^*_s = ARGMAX_{D_s} \{\Sigma_{x \in D_s} \Sigma_{i=1}((1 - \underline{y}^i f_i(x))/2)\}$ CONSTRAINED TO $\underline{y}^i \in \{-1, 1\}$
(EQUATION FOR MAXIMUM LOSS REDUCTION WITH MAXIMAL CONFIDENCE)

308 — CALCULATE THE EXPECTED LOSS REDUCTION WITH THE MOST CONFIDENT LABEL VECTOR $\underline{y}$, $SCORE(x) = \Sigma^k_{i=1}((1 - \underline{y}^i f_i(x))/2)$ 310 — SORT SCORE(x) IN DECREASING ORDER FOR ALL x IN $D_u$ 312 — SELECT A SET OF S EXAMPLES $D^*_s$ WITH THE LARGEST SCORES (OR EXPERIENCED SME INPUT),
AND UPDATE THE TRAINING SET $D_l <= D_l + D^*_s$

END FOR

314 — TRAIN THE MULTI-LABEL LEARNER l WITH $D_l$
t = t + 1;
*END WHILE*

$f_i(x)$ IS A MULTI-LABEL SVM CLASSIFIER ASSOCIATED WITH CLASS i $x_1..x_n$ DATA POINTS (e.g. PROPERTY VECTOR FOR EACH SERVER x – [OS TYPE, OS VERSION, APPLICATION TYPE/VERSION, CRITICALITY, VALUE, COMMUNICATION PATTERN, ETC.])

FIG. 3

PERFORMING SERVER MIGRATION AND DEPENDENT SERVER DISCOVERY IN PARALLEL

This application is a continuation of application Ser. No. 14/712,117, filed May 14, 2015, the entirety of which is hereby incorporated by reference herein.

BACKGROUND

1. Field

The disclosure relates generally to migration of server virtual machine images in a distributed network environment and more specifically to performing server virtual machine image migration and dependent server virtual machine image discovery in parallel in real-time during execution time for the migration of the server virtual machine image.

2. Description of the Related Art

In the last decade, enterprises have started to centralize information technology (IT) infrastructure through a variety of methods and primarily through data center consolidation. With the promise of low-cost access to flexible and on-demand elastic computing resources, enterprises are increasingly migrating their existing workloads from a source environment, such as a data center environment, to a target environment, such as a private cloud environment. Migration of IT infrastructure transfers an enterprise's data, applications, and services to one or more target environments. Yet, the heterogeneity and complexity of legacy IT infrastructure make it challenging to streamline processes of migration on an enterprise scale.

SUMMARY

According to one illustrative embodiment, a computer-implemented method for performing server virtual machine image migration and dependent server virtual machine image discovery in parallel is provided. In response to a computer receiving a request to migrate a server virtual machine image that performs a workload to a client device via a network, the computer starts migration of the server virtual machine image to the client device via the network and the computer continuously discovers an identity of a set of dependent server virtual machine images corresponding to the server virtual machine image being migrated to the client device. In response to the computer discovering the identity of the set of dependent server virtual machine images, the computer generates a server migration pattern of the discovered set of dependent server virtual machine images for the workload. The computer calculates a level of risk corresponding to migrating each dependent server virtual machine image of the discovered set of dependent server virtual machine images to the client device based on the server migration pattern of the discovered set of dependent server virtual machine images for the workload. According to other illustrative embodiments, a computer system and a computer program product for performing server virtual machine image migration and dependent server virtual machine image discovery in parallel are provided.

BRIEF DESCRIPTION OF THE DRAWINGS

FIG. 3 is a diagram of an example of a machine learning algorithm for multi-label classification of server migration and discovery patterns in accordance with an illustrative embodiment;

DETAILED DESCRIPTION

Figure 1:
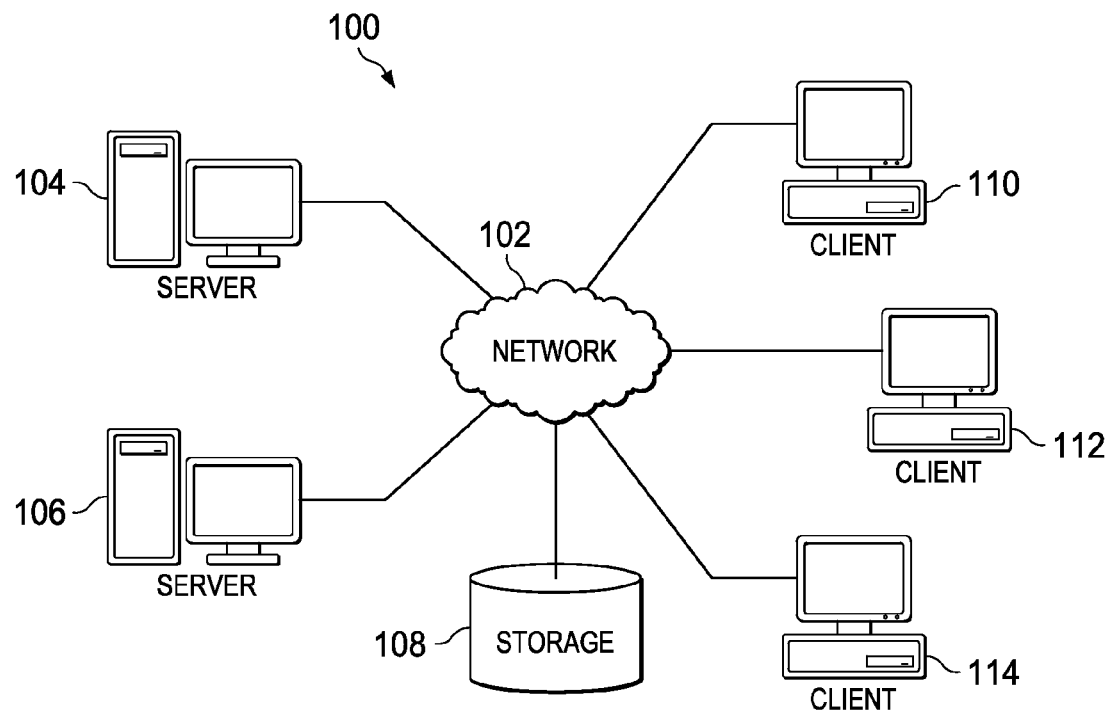
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
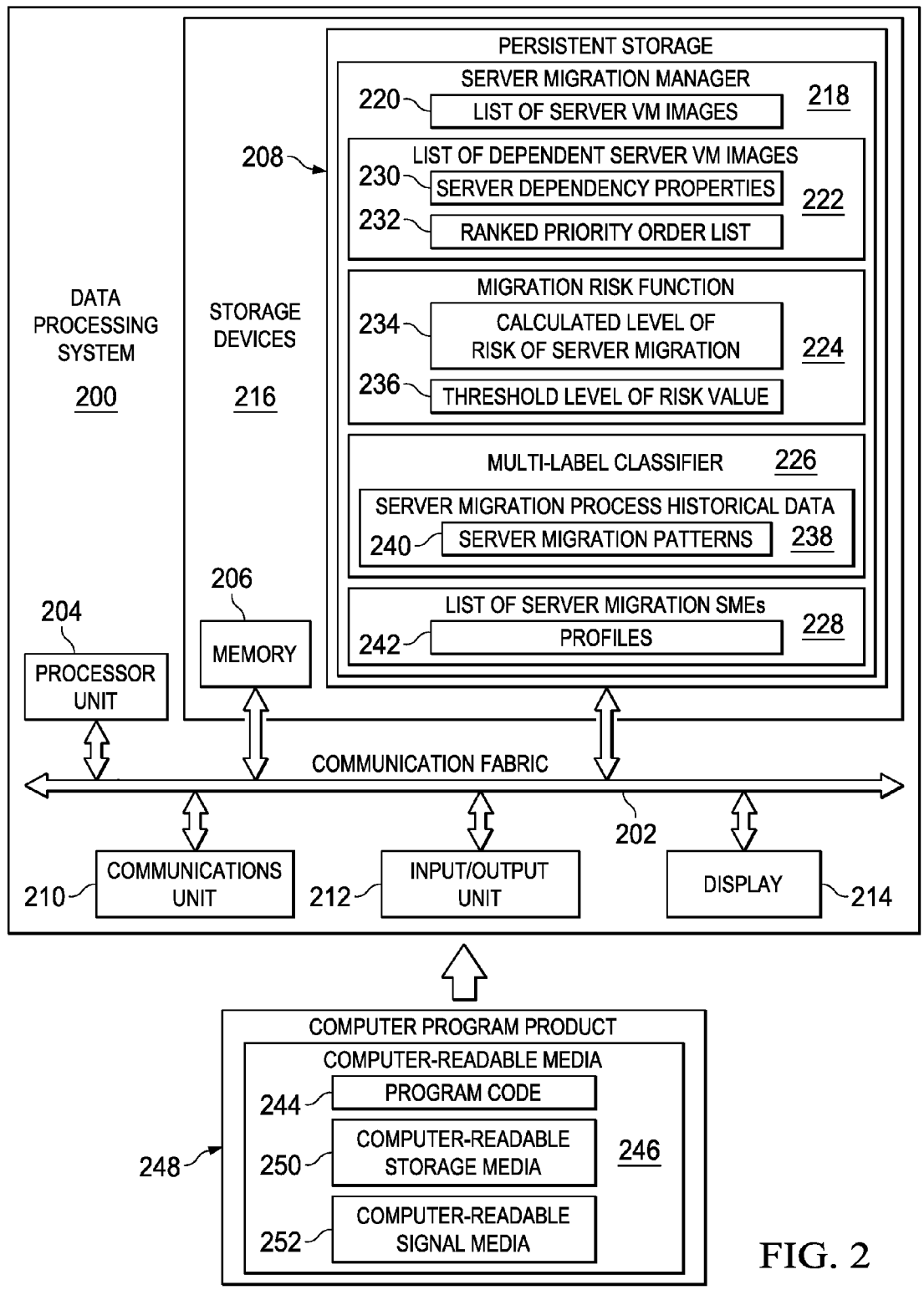
FIG. 2 is a diagram of a data processing system in which illustrative embodiments may be implemented.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 may represent a cloud computing environment, such as a public, private, or hybrid cloud environment, for processing a plurality of computer workloads or tasks. However, it should be noted that network data processing system 100 may represent any type of distributed network environment.

Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide server virtual machine image migration services to registered client devices. A server virtual machine image migration service transfers or moves a server virtual machine image from a source computing environment to a target computing environment. A virtual machine (VM) image is an emulation or imitation of a computer system and includes, for example, an operating system, software stack, library, et cetera, for executing a set of one or more computer workloads.

Client device 110, client device 112, and client device 114 also connect to network 102. Client devices 110, 112, and 114 are registered clients to server 104 or server 106. In the depicted example, server 104 or server 106 may provide information, such as server virtual machine images, boot files, operating system images, and software applications to client devices 110, 112, and 114.

In this example, client devices 110, 112, and 114 are computers, such as network computers with wire or wireless communication links to network 102. However, it should be noted that client devices 110, 112, and 114 are intended as examples only. In other words, client devices 110, 112, and 114 also may include desktop computers, laptop computers, tablet computers, handheld computers, smart phones, personal digital assistants, and gaming devices, for example.

Storage 108 is a network storage device capable of storing data in a structured format or unstructured format. Storage 108 may provide storage of a plurality of different customer names and identification numbers corresponding to a plurality of registered client devices. Storage 108 also may store a plurality of server virtual machine images, server virtual machine image dependencies, server virtual machine image properties, list of server virtual machine images ranked in priority order, migration risk functions, migration risk threshold levels, multi-label classifiers, server virtual machine image migration process historical data, server virtual machine image migration patterns, list of server migration subject matter experts (SMEs), and the like. Further, storage unit 108 may store other data, such as authentication or credential data that may include user names, passwords, and biometric data associated with system administrators and migration engineers. It should be noted that storage unit 108 may store any data that may be utilized by the server virtual machine image migration service.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores server migration manager 218. Server migration manager 218 is a software program that provides the server virtual machine image migration service to registered client devices, such as clients 110-114 in FIG. 1. In other words, server migration manager 218 controls the migration of server virtual machine images to the registered client devices via a network, such as network 102 in FIG. 1. However, it should be noted that even though server migration manager 218 is illustrated as residing in persistent storage 208, in an alternative illustrative embodiment server migration manager 218 may be a separate component of data processing system 200. For example, server migration manager 218 may be a hardware component coupled to communication fabric 202 or a combination of hardware and software components.

In this example, server migration manager 218 includes list of server virtual machine images 220, list of dependent server virtual machine images 222, migration risk function 224, multi-label classifier 226, and list of server migration subject matter experts 228. However, illustrative embodiments are not limited to such. In other words, server migration manager 218 may include more or fewer components than illustrated.

List of server virtual machine images 220 is a list of server virtual machine images that perform a particular workload and are scheduled to be migrated to a set of one or more registered client devices. List of dependent server virtual machine images 222 is a list of different sets of dependent server virtual machine images that also need to be migrated to the set of registered client devices. A set of dependent server virtual machine images is a group of one or more server virtual machine images that are required for another server virtual machine image to perform the workload properly. For example, a database server image, a firewall server image, and a memory cache server image may be dependent server virtual machine images for a Web service server virtual machine image to perform the Web service properly and securely.

Server dependency properties 230 are attributes or features of dependent server virtual machine images. For example, server dependency properties 230 may include a server dependency graph and strength of communication connections between servers executing a workload, such as number of communication connections between servers, type of communication connections between servers, and function of the communication connections, such as data backup connections versus data processing connections. Server dependency properties 230 also may include server image operating system (OS) type, OS version, application type and version, type of workload, criticality of server to workload, estimated migration time, migration failure impact, communication pattern, et cetera.

Server migration manager 218 may represent each server virtual machine image X as a vector of properties, such as $p_1, p_2, \ldots, p_n$. $P_1$ may be a server dependency graph associated with server X, for example. A high degree of dependency gives the server a high ranking priority score. $P_2$ may be a critical middleware group. Middleware is typically categorized as critical, moderate, or non-critical. For example, a database is critical and scored differently. $P_3$ may be how many workloads are impacted when server X is migrated at time $t_1$.

For example, server migration manager 218 may represent server virtual machine image X as an n-dimensional property vector, such as X=[OS, IP, Port_1, . . . , Port_n, Middleware (MW)_1, . . . , MW_n, CPU_usage, Net_vol, Link_1_weight, . . . , Link_n_weight, . . . ]. As a specific example, X=[Linux_redhat_7.0_64, 9.12.128.1, port_43, port_521, . . . port_7939, CPU_88, MW_DB2, MW_Apache, . . . , Link_db2_0.8, Link_Apache_0.7, . . . ]. Then, server migration manager 218 may apply K-mean-based clustering for server migration pattern recognition. For example, server migration manager 218 may utilize the following equation:

$$\underset{S}{\operatorname{argmin}} \sum_{i=1}^{k} \sum_{x \in S_i} \|x - \mu_i\|^2.$$

Given a set of discovered dependent server virtual machine images (X_1, X_2, . . . , X_n), where each X_i is a n-dimensional property vector, server migration manager 218 partitions X_n into K number of sets S, such as S={S_1, S_2, . . . , S_k}. Then, server migration manager 218 labels recognized server migration patterns and stores the patterns as signatures. Subsequently, server migration manager 218 calculates a similarity-based score against existing discovered server migration patterns to automatically recognize patterns in new server virtual machine images. Server migration manager 218 may utilize, for example, the following equation to calculate the similarity-based score:

$$D(X, T) = \sum_i \left\| \frac{X_i - T_i}{\sigma_i} \right\|.$$

Assume a new server virtual machine image property vector X={X_1, X_2, X_n}, and server migration pattern templates T={T_1, T_2, . . . , T_n}. D(X,T) is the similarity-based score after normalization, indicating whether the migration pattern for the new server virtual machine image is similar to an existing server virtual machine image migration pattern or not. If the new server virtual machine image migration pattern is similar to an existing server virtual machine image migration pattern, then server migration manager 218 places the new server virtual machine image in a group of server virtual machine images having the same or similar migration pattern. If the new server virtual machine image migration pattern is not similar to an existing server virtual machine image migration pattern, then server migration manager 218 may generate a new group of server virtual machine images. Alternatively, server migration manager 218 may send the new server virtual machine image migration pattern to a server migration subject matter expert to review the pattern and label the pattern, if possible, or to generate a new group for the new pattern.

Server migration manager 218 may place list of dependent server virtual machine images 222 in a ranked priority order, such as ranked priority order list 232. Server migration manager 218 places dependent server virtual machine images within ranked priority order list 232 based on server dependency properties 230 of each particular dependent server virtual machine image. Ranked priority order list 232 lists dependent server virtual machine images starting from a highest priority dependent server virtual machine image to a lowest priority dependent server virtual machine image. Server migration manager 218 uses ranked priority order list 232 to determine the order in which to migrate dependent server virtual machine images (i.e., starting from highest priority and going to lowest priority in the list).

Server migration manager 218 also utilizes migration risk function 224 to calculate a level of risk corresponding to migrating each particular server virtual machine image, such as calculated level of risk of server migration 234. Server migration manager 218 utilizes threshold level of risk value 236 to compare with calculated level of risk of server migration 234 to determine a level of confidence in migrating particular server virtual machine images to the target environment. For example, if calculated level of risk of server migration 234 for a particular server virtual machine image is below threshold level of risk value 236, then server migration manager 218 may send an alert to a system administrator or migration engineer that a confidence level in migration of this particular server virtual machine image is low.

Migration risk function 224 may be, for example:

$$R(\theta, \delta) = \mathbb{E}_\theta L(\theta, \delta(X)) = \int_x L(\theta, \delta(X)) dP_\theta(X).$$

θ is a fixed or possibly unknown state of a population of servers in a distributed environment. X is a vector of observations stochastically drawn from the population of server, such as, for example, communication connection patterns between server S1, server S2, server S3, and server Sn, criticality of each server in the population, workload performance of each server in the population, impact of server migration on the overall workload performance, et cetera. E is the expectation over all the population values of X. $dP_\theta$ is a probability measure over the event space of X, parameterized by θ. The integral is evaluated over the entire support of X.

Server migration manager 218 utilizes multi-label classifier 226 to identify and label server migration patterns 240 in server migration process historical data 238. Multi-label classifier 226 may utilize a support vector machine-based active learning algorithm for multi-label classification of server migration and dependent server discovery patterns. A support vector machine is a supervised learning model with associated learning algorithms that analyze data and recognize patterns, used for classification analysis. Given a set of training examples, a support vector machine training algorithm builds a model that assigns new examples into one category or another. A support vector machine model is a representation of the examples as points in space, mapped so that the examples of the separate categories are divided by a clear gap that is as wide as possible. New examples are then mapped into that same space and predicted to belong to one of the categories based on where the new examples are mapped to in the space. A server migration pattern may be, for example, the impact that a particular server migration has on workload performance, such as processor and memory utilization. A dependent server discovery pattern may be, for example, number and type of communication connections between servers.

Server migration manager 218 may utilize list of server migration subject matter experts 228 to request that a server migration subject matter expert review server migration patterns 240 and modify, if necessary. Server migration manager 218 may utilize profiles 242 to identify an appropriate server migration subject matter expert to review a particular set of server migration patterns in server migration patterns 240. Profiles 242 may include for example, number of years of work experience, area of expertise, such as types of server images the expert has previous experience with, employment record, et cetera.

Communications unit 210, in this example, provides for communication with other computers, data processing systems, and devices via a network. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that heterogeneity and complexity of source computing environments, coupled with regulatory and governance constraints, such as, for example, approvals to deploy discovery scripts, demand a significant level of manual intervention and supervision by migration engineers during server migration to a target computing environment. In turn, this significant level of manual intervention and supervision impacts duration and quality of execution of migration processes and also increases dependency on the migration engineers' skill levels making migrating enterprise-scale workloads technically challenging and error prone.

For example, on-premise servers typically run on different platforms, different physical hardwares, and various hypervisors that involve different image formats. As a result, no one-size fits all migration approach currently exists. Challenges in managing human activities in migration span from process governance, access to common content, such as, for example, target computing environment design, decisions, and what/if analysis, timely notifications to process tracking, et cetera. Consequently, a sequential migration plan is needed because it is unfeasible to migrate tens of thousands servers that are typical of enterprise customers all at once.

Illustrative embodiments perform server migration and dependent server discovery in parallel at execution time. Illustrative embodiments identify an optimal sequence of discovered server dependencies, based on workload and server properties. Server properties may include, for example, criticality of a server in performance of a particular workload and server communication patterns, such as a monthly data processing workload communication pattern, to prioritize migration execution of server virtual machine images. Illustrative embodiments generate a prioritized list of servers scheduled for migration to a target computing environment. Illustrative embodiments determine server migration priority based on illustrative embodiments calculating a level of risk corresponding to migration of each server to the target computing environment. Illustrative embodiments calculate the level of risk based on properties associated with each particular server.

Thus, illustrative embodiments determine server migration order for dependent servers based on the calculated level of risk, when executing server migration and dependent server discovery in parallel, by considering multiple server properties, such as, for example, criticality of servers to execution of workloads, communication connection patterns between dependent servers, impact of migration on server workload performance, et cetera. Illustrative embodiments utilize a machine learning engine that captures repeatable patterns in servers and communications. The machine learning engine may include a machine learning component and an active learning component. The machine learning component utilizes server migration process historical data and topology data to identify server migration patterns. The active learning component engages human subject matter experts to review and increase the quality of server migration pattern data. As a result, illustrative embodiments decrease end-to-end server migration time as experienced by customers. In addition, illustrative embodiments decrease the time to start server migration, without having to wait for the discovery of dependent server process to complete prior to execution. By continuously sending migration requests with migration risk assessments, illustrative embodiments increase migration efficiency and reduce migration costs. Thus, the process is iterative so that illustrative embodiments continuously find a next group of server virtual machine images to migrate to a target computing environment, while at the same time calculating migration risk scores to prioritize server migration execution order. Illustrative embodiments find an optimal migration sequence of sever virtual machine images based on the calculated migration risk scores, the workload, and properties of the server virtual machine images to prioritize migration execution. Consequently, illustrative embodiments execute server migration with minimum risk, while satisfying the workload and the properties of the server virtual machine images.

With reference now to FIG. 3, a diagram of an example of a machine learning algorithm for multi-label classification of server migration and discovery patterns is depicted in accordance with an illustrative embodiment. Support vector machine (SVM)-based learning algorithm 300 provides multi-label classification of server virtual machine image migration and discovery patterns. Support vector machine-based learning algorithm 300 may be implemented in a multi-label classifier, such as multi-label classifier 226 in FIG. 2.

Support vector machine-based learning algorithm 300 receives as input labeled set $D_l$, unlabeled set $D_u$, number of steps T, and number of examples per iteration S. Labeled set $D_l$ is a set of previously identified server virtual machine image migration and discovery patterns stored in a server migration pattern database, for example. Unlabeled set $D_u$ is a set of newly discovered server virtual machine image migration and discovery patterns.

A server migration manager, such as, for example, server migration manager 218 in FIG. 2, may train multi-label SVM classifier f based on training data in labeled set $D_l$. For each server image instance x in unlabeled set $D_u$, support vector machine-based learning algorithm 300 predicts a label vector y for each instance x using a loss reduction-based prediction method, for example. Then, support vector machine-based learning algorithm 300 calculates an expected loss reduction score with the most confident label vector y. Afterward, support vector machine-based learning algorithm 300 sorts scores for each instance x in decreasing order for all x in unlabeled set $D_u$. Support vector machine-based learning algorithm 300 selects a set of S examples $D^*_s$ with the highest ranking scores and updates the training set $D_l$ with $D^*_s$. In addition, the server migration manager may train a multi-label learner l with updated training set $D_l$.

Figure 4A:
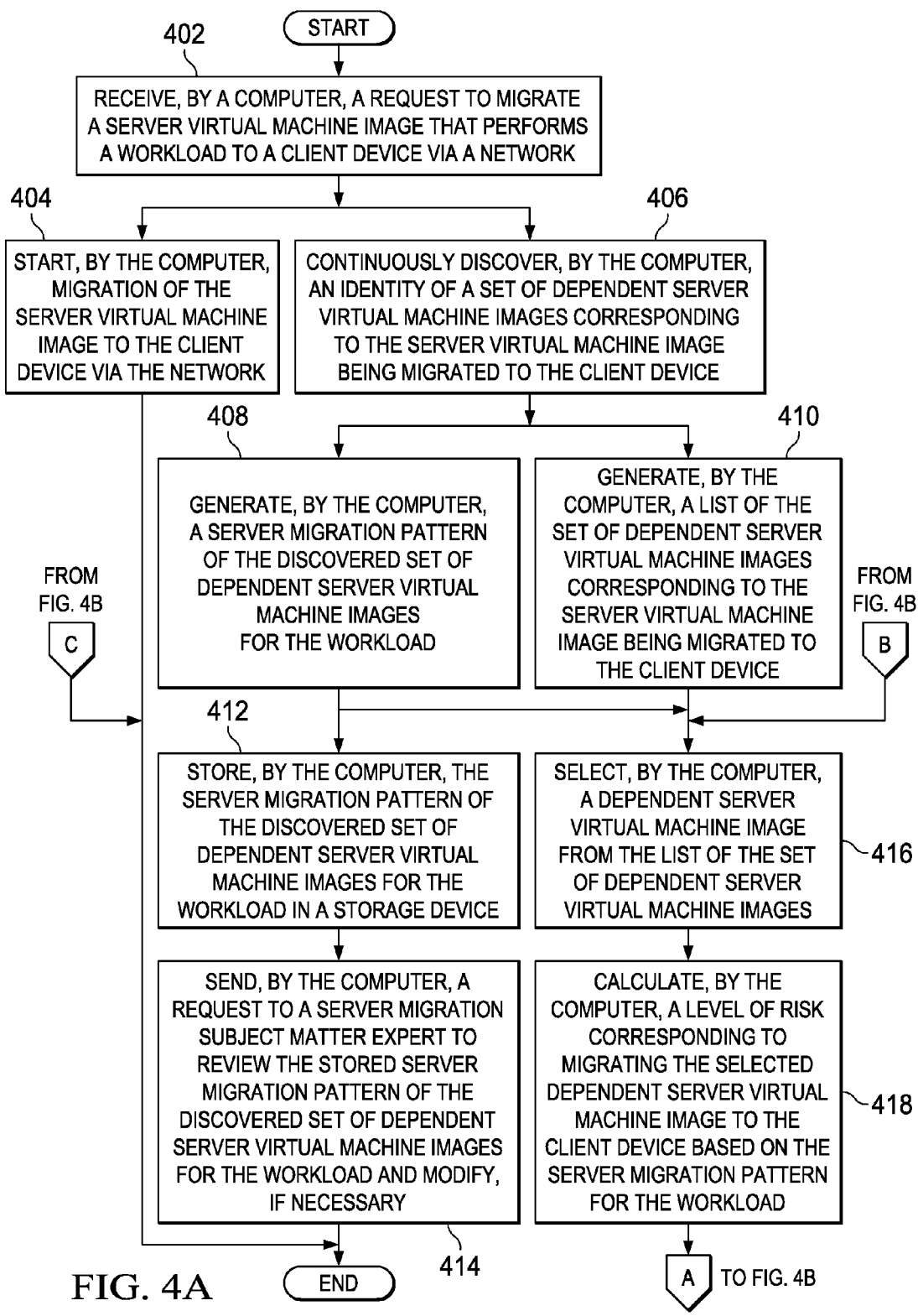
FIGS. 4A and 4B are a flowchart illustrating a process for performing server virtual machine image migration and dependent server virtual machine image discovery in parallel in real-time during execution time for the migration of the server virtual machine image in accordance with an illustrative embodiment.
Figure 4B:
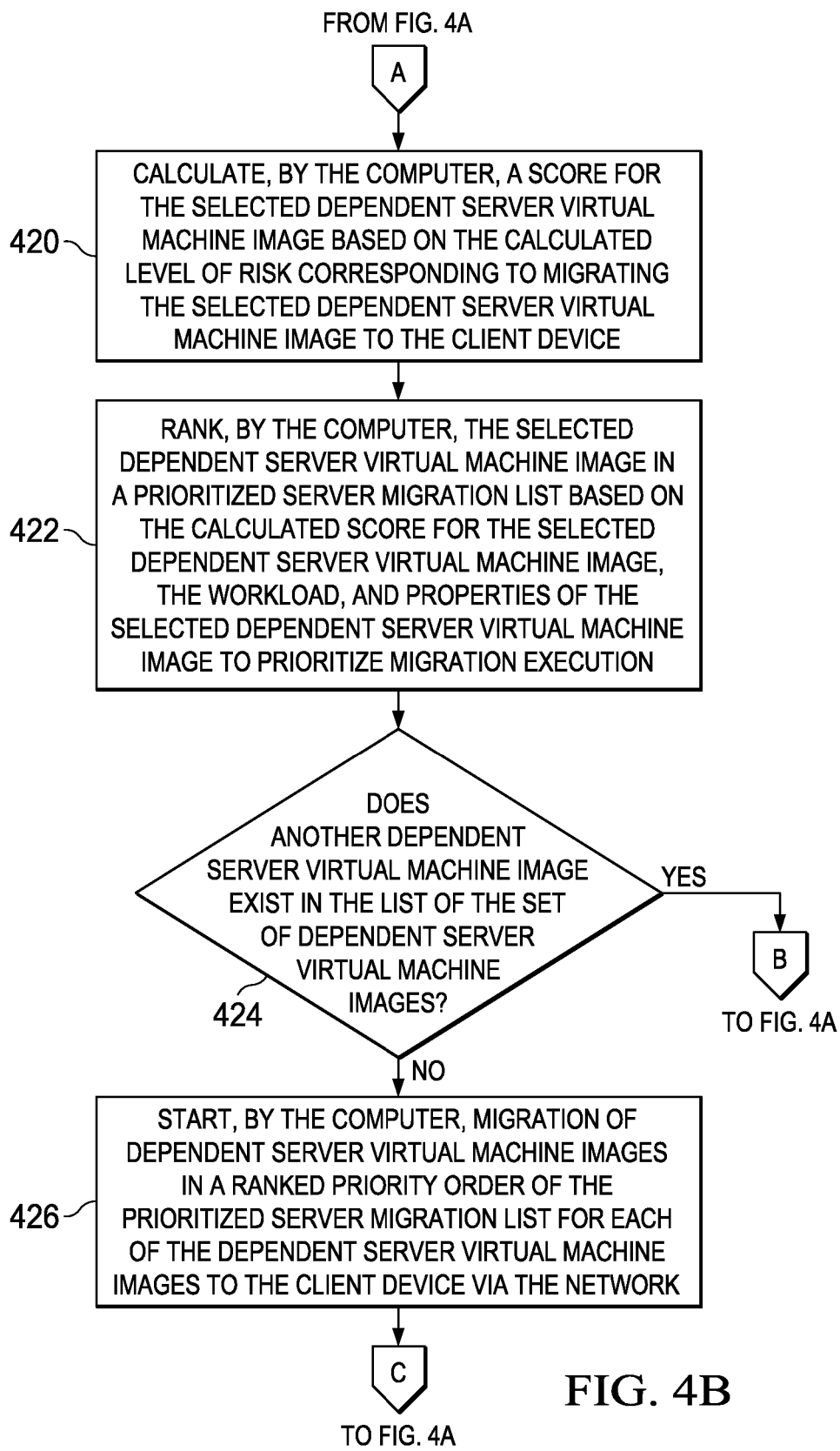

With reference now to FIGS. 4A and 4B, a flowchart illustrating a process for performing server virtual machine image migration and dependent server virtual machine image discovery in parallel in real-time during execution time for the migration of the server virtual machine image is shown in accordance with an illustrative embodiment. The process shown in FIGS. 4A and 4B may be implemented in a computer, such as data processing system 200 in FIG. 2.

The process begins when the computer receives a request to migrate a server virtual machine image that performs a workload to a client device via a network (step 402). The server virtual machine image may be, for example, a server virtual machine image in list of server virtual machine images 220 in FIG. 2. The client device and network may be, for example, client device 110 and network 102 in FIG. 1.

After receiving the request to migrate the server virtual machine image in step 402, the computer starts migration of the server virtual machine image to the client device via the network (step 404) and, in parallel, the computer continuously discovers an identity of a set of dependent server virtual machine images corresponding to the server virtual machine image being migrated to the client device (step 406). In response to discovering the identity of the set of dependent server virtual machine images in step 406, the computer generates a server migration pattern of the discovered set of dependent server virtual machine images for the workload (step 408) and, in parallel, the computer generates a list of the set of dependent server virtual machine images corresponding to the server virtual machine image being migrated to the client device (step 410). The list of the set of dependent server virtual machine images may be, for example, list of dependent server virtual machine images 222 in FIG. 2.

Subsequent to generating the server migration pattern in step 408, the computer stores the server migration pattern of the discovered set of dependent server virtual machine images for the workload in a storage device (step 412). The computer may, for example, store the server migration pattern in server migration patterns 240 in persistent storage 208 in FIG. 2. In addition, the computer sends a request to a server migration subject matter expert to review the stored server migration pattern of the discovered set of dependent server virtual machine images for the workload and modify, if necessary (step 414). The computer may select the server migration subject matter expert from, for example, list of server migration subject matter experts 228 in FIG. 2.

After generating the list of the set of dependent server virtual machine images in step 410, the computer selects a dependent server virtual machine image from the list of the set of dependent server virtual machine images (step 416). Then, the computer calculates a level of risk corresponding to migrating the selected dependent server virtual machine image to the client device based on the server migration pattern for the workload (step 418). Further, the computer calculates a score for the selected dependent server virtual machine image based on the calculate level of risk corresponding to migrating the selected dependent server virtual machine image to the client device (step 420).

Afterward, the computer ranks the selected dependent server virtual machine image in a prioritized server migration list based on the calculated score for the selected dependent server virtual machine image, the workload, and properties of the selected dependent server virtual machine image to prioritize migration execution (step 422). The prioritized server migration list may be, for example, ranked priority order list 232 in FIG. 2. Subsequently, the computer makes a determination as to whether another dependent server virtual machine image exists in the list of the set of dependent server virtual machine images (step 424).

If the computer determines that another dependent server virtual machine image does exist in the list of the set of dependent server virtual machine images, yes output of step 424, then the process returns to step 416 where the computer selects another dependent server virtual machine image from the list. If the computer determines that another dependent server virtual machine image does not exist in the list of the set of dependent server virtual machine images, no output of step 424, then the computer starts migration of dependent server virtual machine images in a ranked priority order of the prioritized server migration list for each of the dependent server virtual machine images to the client device via the network (step 426). Thereafter, the process terminates.

Figure 5:
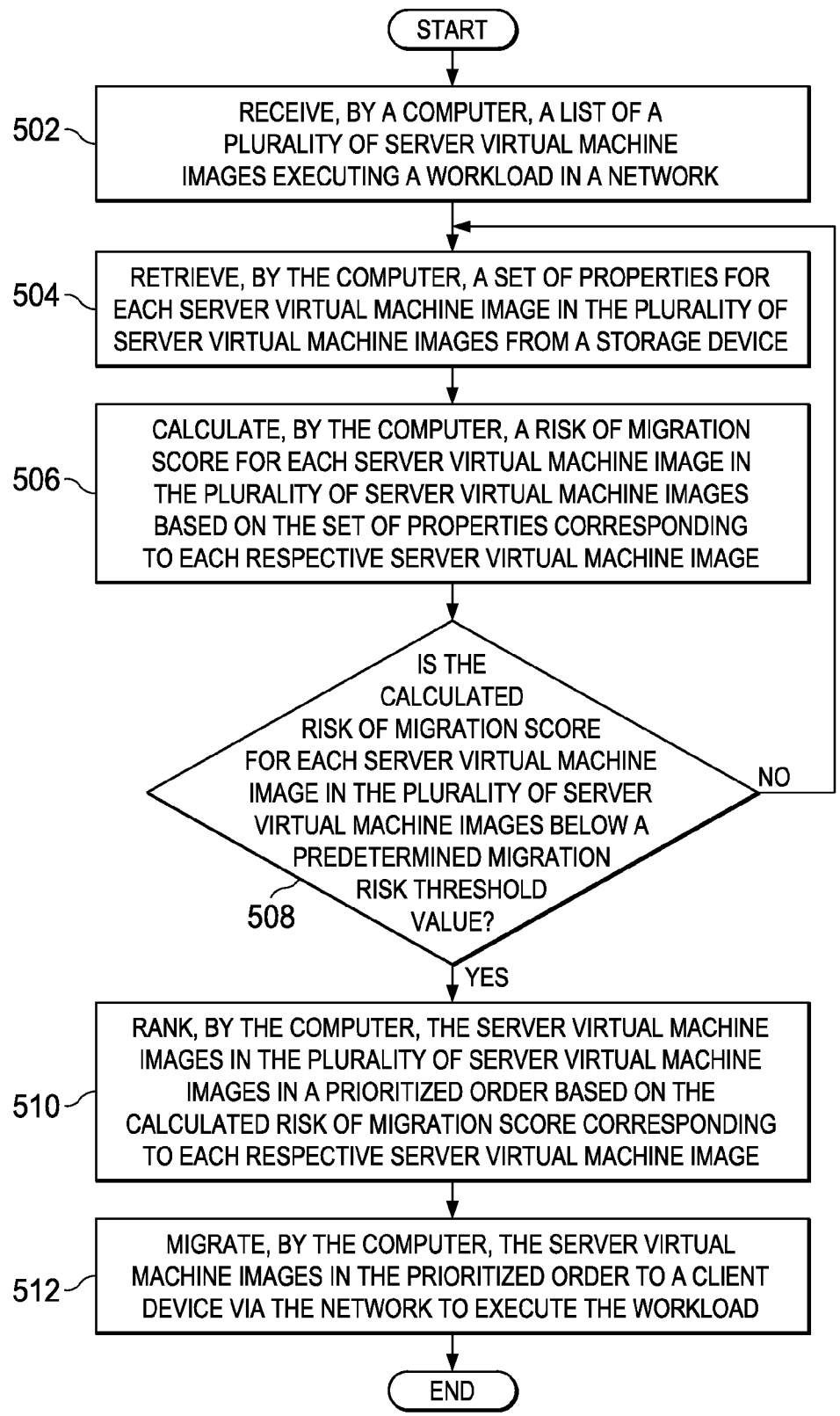
FIG. 5 is a flowchart illustrating a process for calculating a level of risk corresponding to server migration in accordance with an illustrative embodiment.

With reference now to FIG. 5, a flowchart illustrating a process for calculating a level of risk corresponding to server migration is shown in accordance with an illustrative embodiment. The process shown in FIG. 5 may be implemented in a computer, such as data processing system 200 in FIG. 2.

The process begins when the computer receives a list of a plurality of server virtual machine images executing a workload in a network (step 502). The network may be, for example, network 102 in FIG. 1. Afterward, the computer retrieves a set of properties for each server virtual machine image in the plurality of server virtual machine images from a storage device (step 504). The set of properties may be, for example, server dependency properties 230 in FIG. 2.

In addition, the computer calculates a risk of migration score for each server virtual machine image in the plurality of server virtual machine images based on the set of properties corresponding to each respective server virtual machine image (step 506). The calculated risk of migration score may be, for example, calculated level of risk of server migration 234 in FIG. 2. Further, the computer makes a determination as to whether the calculated risk of migration score for each server virtual machine image in the plurality of server virtual machine images is below a predetermined migration risk threshold value (step 508). The predetermined migration risk threshold value may be, for example, threshold level of risk value 236 in FIG. 2.

If the computer determines that the calculated risk of migration score for each server virtual machine image in the plurality of server virtual machine images is not below the predetermined migration risk threshold value, no output of step 508, then the process returns to step 504 where the computer searches for other properties. If the computer determines that the calculated risk of migration score for each server virtual machine image in the plurality of server virtual machine images is below the predetermined migration risk threshold value, yes output of step 508, then the computer ranks the server virtual machine images in the plurality of server virtual machine images in a prioritized order based on the calculated risk of migration score corresponding to each respective server virtual machine image (step 510). Further, the computer migrates the server virtual machine images in the prioritized order to a client device via the network to execute the workload (step 512). The client device may be, for example, client 110 in FIG. 1. Thereafter, the process terminates.

Thus, illustrative embodiments of the present invention provide a computer-implemented method, computer system, and computer program product for performing server virtual machine image migration and dependent server virtual machine image discovery in parallel in real-time during execution time for the migration of the server virtual machine image. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for performing server virtual machine image migration and dependent server virtual machine image discovery in parallel, the computer-implemented method comprising:

responsive to a computer receiving a request to migrate a server virtual machine image that performs a workload to a client device via a network, starting, by the computer, migration of the server virtual machine image to the client device via the network and, in parallel in real-time during execution of the migration, continuously discovering, by the computer, an identity of a set of dependent server virtual machine images corresponding to the server virtual machine image being migrated to the client device to increase performance of the client device by decreasing server migration time;

responsive to the computer discovering the identity of the set of dependent server virtual machine images, generating, by the computer, a server migration pattern of the discovered set of dependent server virtual machine images for the workload;

calculating, by the computer, a level of risk corresponding to migrating each dependent server virtual machine image of the discovered set of dependent server virtual machine images to the client device based on the server migration pattern of the discovered set of dependent server virtual machine images for the workload;

calculating, by the computer, a score for each dependent server virtual machine image based on the calculated level of risk corresponding to migrating each of the dependent server virtual machine images to the client device;

ranking, by the computer, each of the dependent server virtual machine images in a prioritized server migration list based on the calculated score for each particular dependent server virtual machine image, the workload, and criticality in performance of the workload by each particular dependent server virtual machine image to prioritize migration execution; and migrating, by the computer, the dependent server virtual machine images in a ranked priority order of the prioritized server migration list for each of the dependent server virtual machine images to the client device via the network to execute the workload.

2. The computer-implemented method of claim 1 further comprising:

responsive to the computer generating the server migration pattern of the discovered set of dependent server virtual machine images for the workload, storing, by the computer, the server migration pattern of the discovered set of dependent server virtual machine images for the workload in a storage device; and sending, by the computer, a request to a server migration subject matter expert to review the stored server migration pattern of the discovered set of dependent server virtual machine images for the workload.

3. The computer-implemented method of claim 1 further comprising:

retrieving, by the computer, a set of properties for each dependent server virtual machine image of the discovered set of dependent server virtual machine images from a storage device; and calculating, by the computer, a risk of migration score for each dependent server virtual machine image of the discovered set of dependent server virtual machine images based on the set of properties corresponding to each respective dependent server virtual machine image.

4. The computer-implemented method of claim 3, wherein the set of properties is attributes of each dependent server virtual machine image and includes at least one of a server image dependency graph, number of communication connections between server images executing the workload, type of communication connections between the server images executing the workload, function of the communication connections between the server images executing the workload, server image operating system type, server image operating system version, type of the workload, criticality of a server image to the workload, estimated migration time, and migration failure impact.

5. The computer-implemented method of claim 3 further comprising:

responsive to the computer determining that the calculated risk of migration score for each dependent server virtual machine image of the discovered set of dependent server virtual machine images is below a predetermined migration risk threshold value, ranking, by the computer, each dependent server virtual machine image of the discovered set of dependent server virtual machine images in a prioritized order based on the calculated risk of migration score corresponding to each respective dependent server virtual machine image.

* * * * *